US012257677B2

(12) United States Patent
Thomson et al.

(10) Patent No.: US 12,257,677 B2
(45) Date of Patent: Mar. 25, 2025

(54) HOSE HANDLING DEVICE AND METHOD (71) Applicants: Victor J. Thomson, Denton, MT (US); Quasar Z. Q. Thomson, Denton, MT (US); Infinity X. I. Thomson, Denton, MT (US)

(72) Inventors: Victor J. Thomson, Denton, MT (US); Quasar Z. Q. Thomson, Denton, MT (US); Infinity X. I. Thomson, Denton, MT (US)

( * ) Notice: Subject to any disclaimer, the term of this patent is extended or adjusted under 35 U.S.C. 154(b) by 42 days.

(21) Appl. No.: 18/202,629

(22) Filed: May 26, 2023

(65) Prior Publication Data
US 2023/0381936 A1    Nov. 30, 2023

Related U.S. Application Data (60) Provisional application No. 63/346,156, filed on May 26, 2022.

(51) Int. Cl.
| B25B 27/10 | (2006.01) |
| A01B 59/00 | (2006.01) |
| B65G 7/12  | (2006.01) |
| F16L 3/10  | (2006.01) |
| F16L 3/12  | (2006.01) |

(52) U.S. Cl.
CPC ............ *B25B 27/10* (2013.01); *A01B 59/002* (2013.01); *B65G 7/12* (2013.01); *F16L 3/10* (2013.01); *F16L 3/1033* (2013.01); *F16L 3/1041* (2013.01); *F16L 3/1211* (2013.01)

(58) Field of Classification Search
CPC ...... B25B 27/10; A01B 59/002; F16L 3/1211; F16L 3/10; F16L 3/1033; F16L 3/1041; B65G 7/12
USPC ............ 137/15.09; 294/16, 106, 15, 26, 62, 294/137–172; 248/76
See application file for complete search history.

(56) References Cited

U.S. PATENT DOCUMENTS

| 128,155   | A | * | 6/1872 | Lowe ........................ B65G 7/12 294/16 |
| 601,639   | A | * | 4/1898 | Doyle ....................... B65G 7/12 239/525 |
| 666,474   | A |   | 1/1901 | Wolfe |
| 674,105   | A | * | 5/1901 | Timm ................. B23B 29/0341 408/180 |
| 735,799   | A | * | 8/1903 | McGill ..................... B65G 7/12 248/78 |
| 877,012   | A | * | 1/1908 | Sullivan ................... B65G 7/12 294/16 |
| 1,058,926 | A |   | 4/1913 | Toole |
| 1,094,113 | A | * | 4/1914 | Bissen .................... E21B 7/046 294/16 |
| 1,231,450 | A | * | 6/1917 | Sutton .................... B65D 59/06 138/96 T |
| 1,625,255 | A | * | 4/1927 | Hudgins ................ A62C 31/28 248/75 |

(Continued)

*Primary Examiner* — Minh Q Le
(74) *Attorney, Agent, or Firm* — Dicke, Billig & Czaja, PLLC (57) ABSTRACT A device includes a mounting portion including a lumen sized and shaped to at least partially encompass, and to be removably secured relative to, a conduit. At least one handle portion extends outward from the mounting portion and at a generally perpendicular angle relative to a central axis of the lumen of the mounting portion.

12 Claims, 9 Drawing Sheets

(56) References Cited

U.S. PATENT DOCUMENTS

| | | | | |
|---|---|---|---|---|
| 2,749,173 | A | * | 6/1956 | Peterson .................. B65G 7/12 |
| | | | | 294/16 |
| 2,819,111 | A | * | 1/1958 | Cozzens .................. F16L 1/06 |
| | | | | 294/16 |
| 3,329,405 | A | * | 7/1967 | Fanshawe ............... E21B 19/20 |
| | | | | 294/102.1 |
| 4,072,369 | A | * | 2/1978 | Segreto .................. E21B 19/24 |
| | | | | 294/16 |
| 4,304,433 | A | * | 12/1981 | Langowski ............. E21B 19/14 |
| | | | | 294/115 |
| 4,632,442 | A | * | 12/1986 | Gerding .................. B65G 7/12 |
| | | | | 294/16 |
| 4,697,830 | A | * | 10/1987 | Wood ...................... E21B 19/24 |
| | | | | 285/379 |
| 4,723,800 | A | * | 2/1988 | Sanders .................. B64G 4/00 |
| | | | | 294/119.2 |
| 4,838,465 | A | * | 6/1989 | Metzger .................. E04G 21/04 |
| | | | | 222/526 |
| 9,248,967 | B1 | | 2/2016 | Gregg |
| 9,457,957 | B1 | * | 10/2016 | Blood .................... F16L 3/1033 |
| 2003/0205906 | A1 | * | 11/2003 | Fiesler .................... B65G 7/12 |
| | | | | 294/16 |
| 2004/0075286 | A1 | * | 4/2004 | Skowron .................. A01B 1/08 |
| | | | | 294/58 |
| 2016/0186902 | A1 | * | 6/2016 | Lee ........................ F16L 21/06 |
| | | | | 285/420 |
| 2018/0015526 | A1 | * | 1/2018 | Brown .................. B21D 39/046 |

\* cited by examiner

HOSE HANDLING DEVICE AND METHOD

CROSS-REFERENCE RELATED APPLICATIONS

This U.S. Patent Application claims the benefit of the filing date of U.S. Provisional Patent Application Ser. No. 63/346,156, filed May 26, 2022, the entire teachings of which are incorporated herein by reference.

BACKGROUND

Control of fluids within conduits, such as hoses, greatly contributes to productivity in many fields, including the agricultural and construction fields, among others. In some instances, a conduit (e.g. hose) must be connected and/or disconnected relative to other hoses or relative to a supply of fluid, and consequently a user often must maneuver the conduit into a particular position to achieve the connection or disconnection, respectively.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense. It is to be understood that features of the various examples described herein may be combined, in part or whole, with each other, unless specifically noted otherwise.

At least some examples of the present disclosure are directed to facilitating effectiveness, efficiency, and convenience in handling conduits (e.g. hoses). Among other uses, at least some examples facilitate making connections and/or disconnections between a hose and a supply of fluid at a base or in a second hose.

With this in mind, in some examples, a device (for handling hoses) may comprise a mounting portion and at least one handle portion. The mounting portion comprises a lumen sized and shaped to at least partially encompass, and to be removably secured relative to, a conduit. The at least one handle portion extends outward from the first portion, and at a generally perpendicular first angle relative to, a central axis of the lumen of the first portion. In some examples, the at least one handle portion may comprise a pair of handle portions which extend (or are extendable) in opposite directions from the mounting portion.

Via such example arrangements, in some examples, the device may be secured (e.g. clamped) directly to the hose, without involving disassembly of the hose end fittings, etc. to install the device. Via the mounting portion, the device may be attached to the hose behind and anywhere reasonably close to a hose end fitting (e.g. male connector in some examples). As further described below, once mounted, the handle portions of the device enable the operator to push the male connector end of the hose axially into a receiving connector (e.g. female receptacle) using the palms of the hands, with much less strength than would otherwise be used in the absence of the device. Accordingly, via the at least one handle portion of the device, one can more readily push the hose and hose connector end in to the receiving connector (e.g. receptacle) to initiate and complete the connection. A similar pulling maneuver, facilitated by the at least one handle portion, may be used to detach the respective connector ends. Via the mounted at least one handle portion, these actions may be performed without having to rely primarily on substantial finger and hand strength (for gripping and pushing), and the operator may instead use their overall strength taking advantage of power in their legs, torso, shoulders and arms which may be translated into a much greater pushing force (via the at least one handle portion) aligned axially with a length of the hose and respective connectors. Among other aspects, the axial orientation of pushing with the body generally (which is made possible via the example arrangement) substantially reduces or eliminates the previous practice of having to very tightly grip the hose with high force (using fingers, hand strength) while awkwardly pushing the hose into its desired connection. Accordingly, the hose handling device enables persons with less hand/arm strength, dexterity, etc. conveniently and quickly connect (and disconnect) hoses.

With this in mind, the example devices and/or example methods may increase safety as the operator is less likely to become imbalanced and fall while pulling or pushing, particularly in view of the frequency with which these types of hoses are slippery due to leaking of fluid (e.g. oil), rain, liquid on the ground, and/or wet hands.

Via the mounting portion, the device can be readily relocated on the hose, and need not to be secured (e.g.

clamped) onto the hose in a specific location. Because the location of the example device on a hose (e.g. hydraulic) may be very easily changed in a few seconds, placement of the device may be adapted quickly so as to not interfere with other hoses or parts of the implement or equipment.

Moreover, because of such ease in mounting and dismounting the entire device or just the handle portions (while leaving the mounting portion on a hose), the hose handling device (or just some components, such as the handle portions) also can be quickly moved from one hose to another hose, or to a different machine, thereby avoiding a situation of having an example device on each and every hose for which the device may be used.

These examples, and additional examples, are described in association with at least FIGS. 1-6B.

Figure 1:
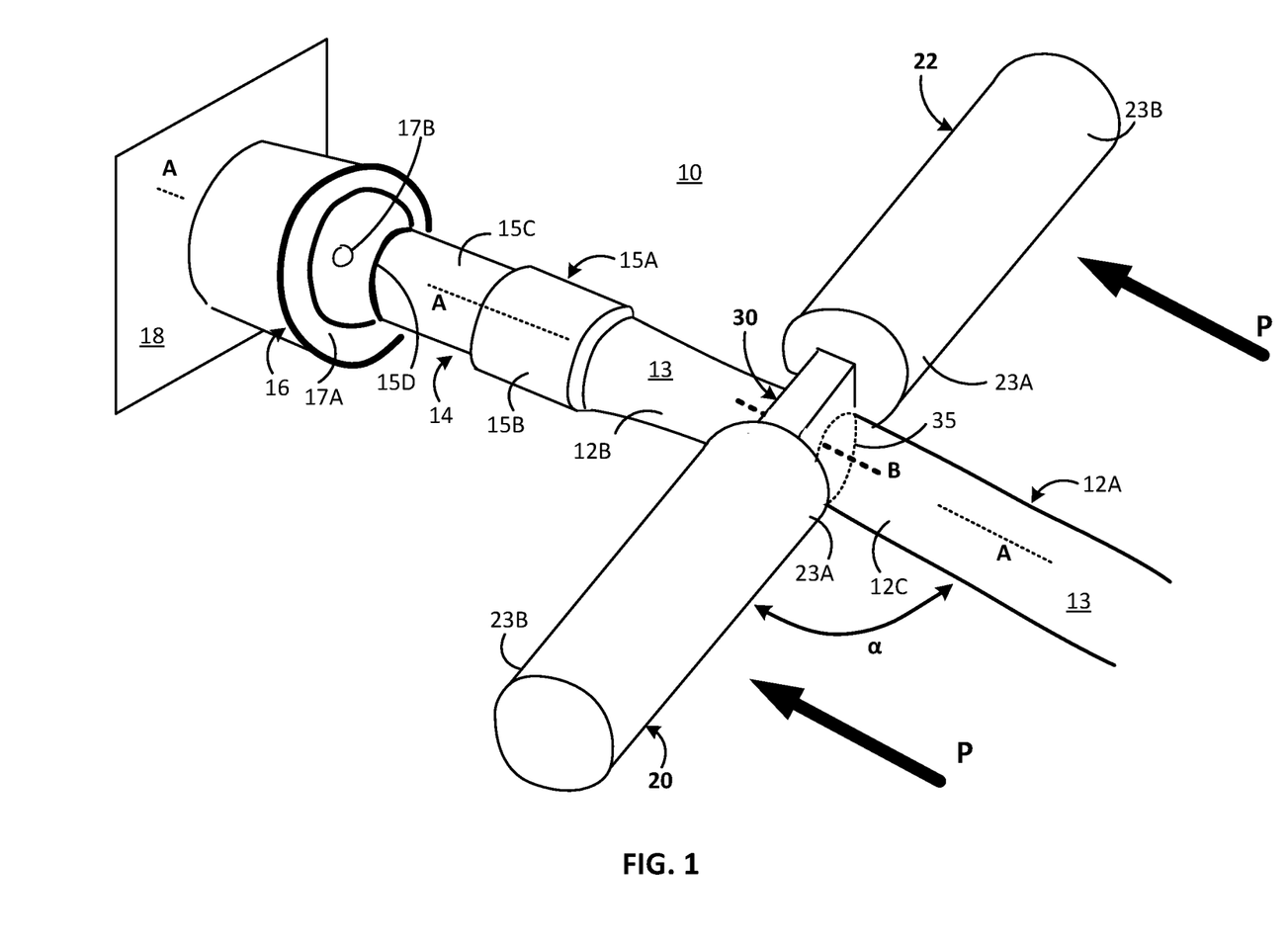
FIG. 1 is a diagram including an isometric view schematically representing an example method and/or example device for connecting, via a hose handling device, the hose relative to a receiver.

FIG. 1 is a diagram schematically representing an example method and/or example device for connecting, via a hose handling device, the hose relative to a receiver. As shown in FIG. 1, in one example arrangement 11, a device 10 comprises a mounting portion 30 and at least one handle portion such as a pair of handle portions 20, 22. The mounting portion 30 comprises a lumen 35 sized and shaped to at least partially encompass, and to be removably secured relative to, a conduit 12A. Each handle portion 20, 22 comprises an inner end portion 23A connected to the mounting portion 30, with a body 23C of each handle portion 20, 22 extending outward from the first portion toward an outer end portion 23B. As shown in FIG. 1, each handle portion 20, 22 extends at a first angle relative to, a central axis B of the lumen 35 of the mounting portion. In some examples, the first angle may comprise about 80 to about 100 degrees, while in some examples, the first angle may comprise about 85 to about 95 degrees, and in some examples, the first angle comprises about 90 degrees (i.e. generally perpendicular). In such examples, the term "about" corresponds to a range between 10 percent (e.g. 0.9) below and 10 percent (e.g. 0.9) above of the enumerated value (e.g. 90).

In some examples, the conduit 12A is resiliently, flexible (or semi-rigid), or at least a portion 12B, 12C of the conduit 12A is resiliently, flexible in a region at which the mounting portion 30 is removably secured relative to the conduit 12A. In some examples, the conduit 12A comprises a first end portion 14 including a first connector 15A sized and shaped (e.g. male) to be removably connectable relative to, a second connector 16 (e.g. female, or vice versa).

In some examples, the connector 15A comprises a collar 15B, connector end 15C, and end 15D. Meanwhile, in some examples, second connector 16 may comprise a receiving portion (e.g. recessed portion) 17A and pin 17B. In some examples, the first connector 15A and second connector 16 may be reversed to take the place of the other's respective position. In some examples, the first connector 15A and second connector 16 may comprise a pair of cooperating "quick disconnect' connectors (also sometimes called quick-disconnect connectors) commonly used in connecting and disconnecting hoses filled with fluid under hydraulic pressure (e.g. pressurized hydraulic fluid).

As further shown in FIG. 1, the second connector 16 may be mounted on or otherwise associated with a frame 18, which may form part of a vehicle (e.g. tractor) in some examples. In some examples, the second connector 16 may enable removable connection to a source of hydraulic fluid under pressure to supply and provide fluid communication with fluid in the conduit 12A being connected thereto.

With this general example arrangement in mind, some example methods may comprise removably securing the mounting portion 30 of device 10 relative to the conduit 12A, including positioning the lumen 35 of the mounting portion 30 to at least partially encompass a cross-sectional outer surface 13 of the conduit 12A. The method may comprise grasping the pair of handle portions 20, 22, which extend outward from the mounting portion 30 in opposite directions, and extend at a generally perpendicular angle (alpha a) relative to a central axis B of the lumen 35 of the mounting portion (and relative to a longitudinal axis A of conduit 12A) at a region (e.g. 12B, 12C) at which mounting portion 30 is secured to conduit 12A.

The method may further comprise pushing (represented via directional force arrows P), while still grasping the handle portions 20, 22, the first connector end 14 of the conduit 12A into removable connection relative to a second connector 16 sized/shaped to receive the first connector end 14 of the conduit 12A.

It will be understood that a similar method may be used to disconnect the hose (and respective connectors from each other) in which the handle portions 20, 22 are grasped to pull the hose 12A and connector 15A away from connector 16. Moreover, as further described later, in some examples, the entire device 10 may be removed from the hose 12A, while in some examples, just the handle portions 20, 22) may be removed from the mounting portion 30 for storage or use with another device 10 mounted on a different hose, different machine, etc.

Figure 2A:
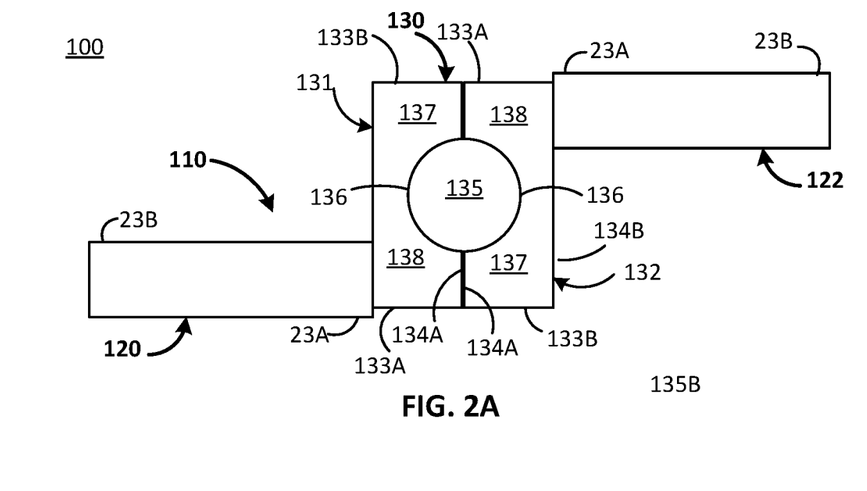
FIG. 2A is a diagram including a side plan view schematically representing an example hose handling device in an assembled state with FIGS. 2B-2D being diagrams schematically representing varying stages of assembly (or disassembly) of components of the hose handling device.
Figure 2B:
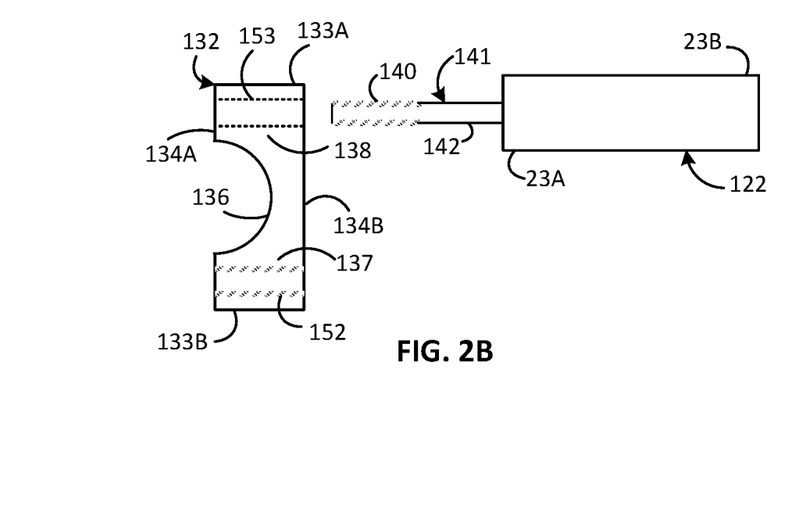
Figure 2C:
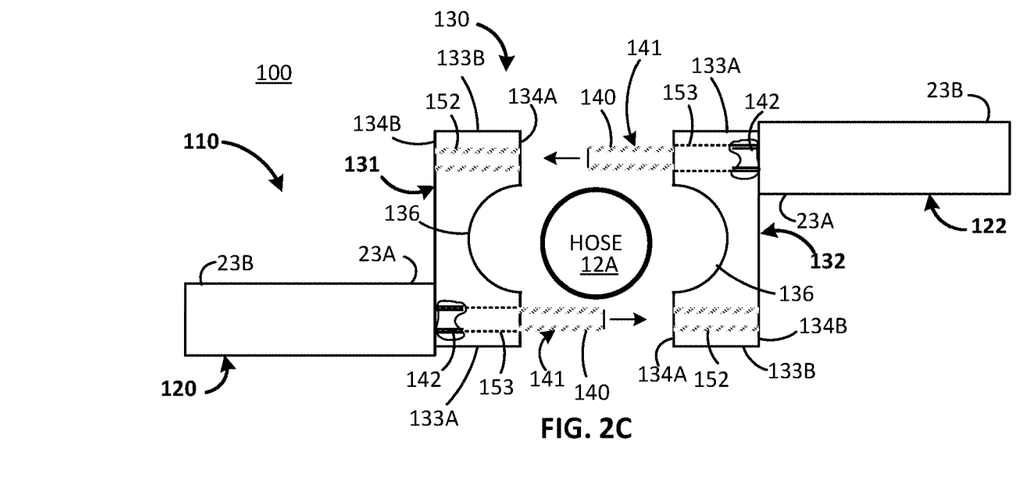
Figure 2D:
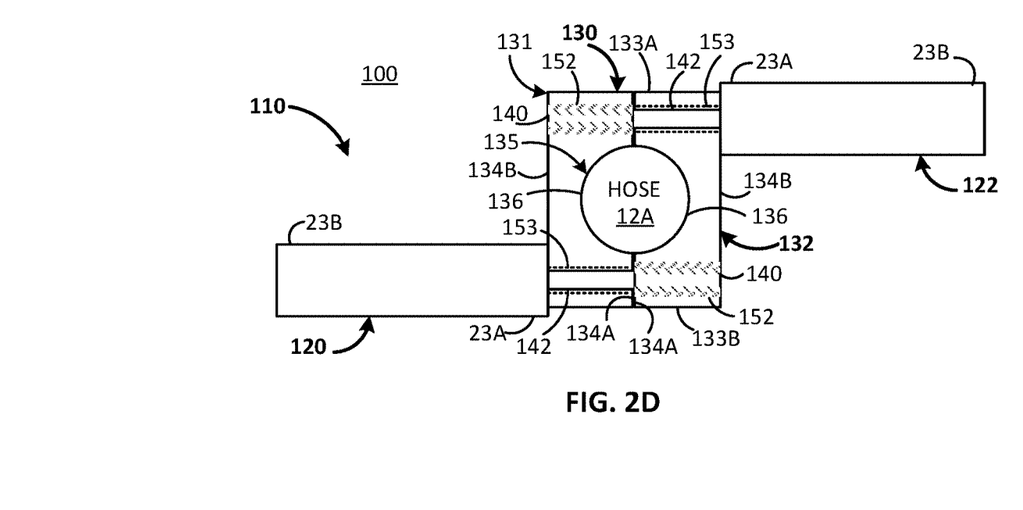

FIG. 2A is a diagram of an example arrangement 100 and including a side view schematically representing an example hose handling device 110 in an assembled state as when removably secured relative to a hose 12A, with FIGS. 2B-2D schematically representing varying degrees of assembly (or disassembly). In some examples, the example hose handling device 110 may comprise an example implementation of, and/or at least some of substantially the same features and/or attributes as, the examples as previously described in association with at least FIG. 1.

As shown in FIG. 2A, in some examples the device 110 comprises a mounting portion 130 and a pair of handle portions 120, 122. In some examples, the mounting portion 130 comprises defining a lumen 135 through which the hose 12A (FIG. 1) would extend. In some examples, the mounting portion 130 includes a first frame portion 131 and a second frame portion 132, wherein the first frame portion 131 and the second frame portion 132 are removably securable relative to each other to implement the removable securing of the mounting portion 130 relative to the hose (e.g. 12A in FIG. 1).

As further shown in FIGS. 2A-2B, in some examples each respective first and second frame portion 131, 132 form at least a portion of the lumen 135 via a recessed portion 136 of each respective frame portion 131, 132 including a size and shape corresponding to a size and shape of a cross-sectional outer surface 13 (FIG. 1) of the hose 12A. In some examples, the recessed portion 136 comprises an arcuate, concave shape, with the cross-sectional shape of the outer surface 13 of the conduit 12A comprising a convex, arcuate shape. In some examples, the recessed portion 136 (and outer surface of conduit) may comprise other shapes.

As further shown in FIGS. 2A-2B, in some examples each respective first and second frame portion 131, 132 comprise a generally rectangular shape including opposite ends 133A, 133B, and opposite side portions 134A, 134B, wherein a respective one of side portions 134A comprises the recessed portion 136. However, in some examples, the outer edge portions (e.g. 134B, 133A, 133B) of the first and second frame portions 131, 132 may comprise an arcuate shape, such as a circular shape. In some such examples, the first and second frame portions 131, 132 may be implemented as a split-ring style clamp.

With further reference to FIG. 2B, each respective first and second frame portion 131, 132 comprises a first wing 137 and a second wing 138, which are located on opposite sides of the recessed portion 136. While FIG. 2B illustrates just second frame portion 132, it will be understood that first frame portion 131 may have identical or substantially the same features but having a 180 degree change in orientation when deployed for assembly together with first frame portion 132 as shown in FIGS. 2A, 2C-2D.

As further shown in FIG. 2B, in some examples the first wing 137 of each respective first and second frame portion 131, 132 includes a threaded bore 152 extending from a first side portion 134A to a second side portion 134B of the first wing 137, and the second wing 138 includes a smooth bore 153 (e.g. clearance hole) extending therethrough from a first side portion 134A to a second side portion 134B. As shown in FIG. 2C, the threaded bore 152 of the second frame portion 132 is alignable to, and sized and shaped to, receive a fastener within and though the threaded bore 152, as further described later in association with at least FIG. 2C.

As shown in FIGS. 2A, 2C-2D, upon removably securing the mounting portion 130 on the conduit, the first side portion 134A of the wings 137, 138 of each respective first and second frame portion 137, 138 will face each other (FIG. 2C) and be moved toward each other (FIG. 2C) to removably contact each other (FIGS. 2A, 2D) with the respective first side portions 134A engaging each other. In this position and orientation, as shown in FIGS. 2A, 2D, the recessed portion 136 of each respective first and second frame portions 131, 132 removably engage the outer surface (13 in FIG. 1) of the hose 12A. In addition, as shown in FIGS. 2C-2D, the smooth bore 153 of one of the respective first and second frame portions 131, 132 becomes aligned in an end-to-end configuration with the threaded bore 152 of the other respective first and second frame portions 131, 132.

In some examples, the mounting portion 130 comprises at least one fastener to removably secure the first frame portion 131 relative to the second frame portion 132. As shown in at least FIGS. 2B-2D, in some examples the at least one fastener comprises a rod 141 extending outwardly from an inner end portion 23A of each respective handle portion 120, 122. In some examples, the rod 141 comprises a smooth inner portion 142 and a threaded outer portion 140. The entire rod 141 and particularly threaded outer portion 140 is sized and shaped to pass through the smooth bore 153 of a wing 138 of a respective one of the first and second frame portions 131, 132 to position the threaded outer portion 140 to become threadedly engaged to threaded bore 152 of 137 wing of the other respective one of the first and second frame portions 131, 132, as best seen in FIGS. 2C-2D. In some examples in which the rod 141 is inserted into a respective one of the first and second frame portions 131, 132 prior to engaging the hose 12A, via handle portions 120, 122 one may full insert the rod 141 into and through the smooth bore 153 so as to expose the threaded portion 140 of the rod 141 for alignment and threaded engagement with the threaded bore 152 of the other (e.g. respective) first and second frame portion 131, 132.

With this arrangement, further pushing and/or rotation of each handle portion 120, 122 causes further advancement of the rod 141 of each handle portion 120, 122 into and through the respective smooth and threaded bores 153, 152 until the rod 141 becomes threadedly engaged to the threaded bore 152 of a respective first and second frame portion 131, 132 to an extent by which the frame portions 131, 132 tightly grip the hose 12A. It will be understood that the recessed portion 136, wings 137, 138, bores 153, 152, etc. (of the frame portions 131, 132 of mounting portion 130) and rod 141 (of handle portions 120, 122) are all sized/shaped relative to each other so that as the rod 141 is advanced (via manipulation of handle portions 120, 122) to removably secure the first and second frame portions 131, 132 (relative to each other and relative to hose 12A), the recessed portions 136 will exert pressure against the outer surface 13 of the hose 12A to ensure that the mounting portion 130 becomes securely mounted onto the hose 12A with enough gripping force in order to withstand pushing pressure (P FIG. 1) exerted on handles 120, 122 and/or to maintain the position of the mounting portion longitudinally along a length of the hose 12A.

In some examples, the recessed portion 136 comprises a surface which includes grooves, knurling, and/or other surface modifications to increase the gripping force (from exertion of the frame portions 131, 132 against the side wall of hose 12A) that maintains the mounting portion 130 in its intended position along a length of the hose 12A and/or its rotational orientation about a circumference of the hose 12A.

After use of the device 10 to cause removable connection of the hose 12A (e.g. connector 15A) to a receiving connector (e.g. 16 in FIG. 1), the device 10 may be removed from the hose 12A by reversing the assembly steps described in association with FIGS. 2A-2D or the device 10 may be left in place as mounted on the hose 12A for future use.

Among other aspects, the example arrangement of FIGS. 2A-2D enable removable mounting of the device without the use of separate, additional tools at least because of the manner in which the rods 141 (including threaded portions which interact with bores (e.g. threaded, smooth) of the frame portions 131, 132) of the handle portions 120,122 act to both secure the first and second frame portions 131, 132 together, and also secure the handle portions 120, 122 relative to the mounting portion 120.

Moreover, the split clamp design offered via the separate first and second frame portions 131, 132 enable adjustment of a diameter of the lumen 135 (formed by recessed portions 136) of the mounting portion 130, which enables the mounting portion 130 to be secured onto different diameter hoses 12A by simply increasing or decreasing spacing between the first and second frame portions 131, 132 during the mounting process described above (e.g. as the respective fasteners are being tightened or loosened). This arrangement may sometimes be referred to as a "one-size-fits-all" device or method.

However, with respect to the example of FIGS. 2A-2D and/or other examples of the present disclosure, multiple devices may be made available to an operator in which each device comprises a different size lumen (e.g. diameter of lumen 35, 135) for achieving a best fit with different diameter hoses.

Figures 3A, 3B:
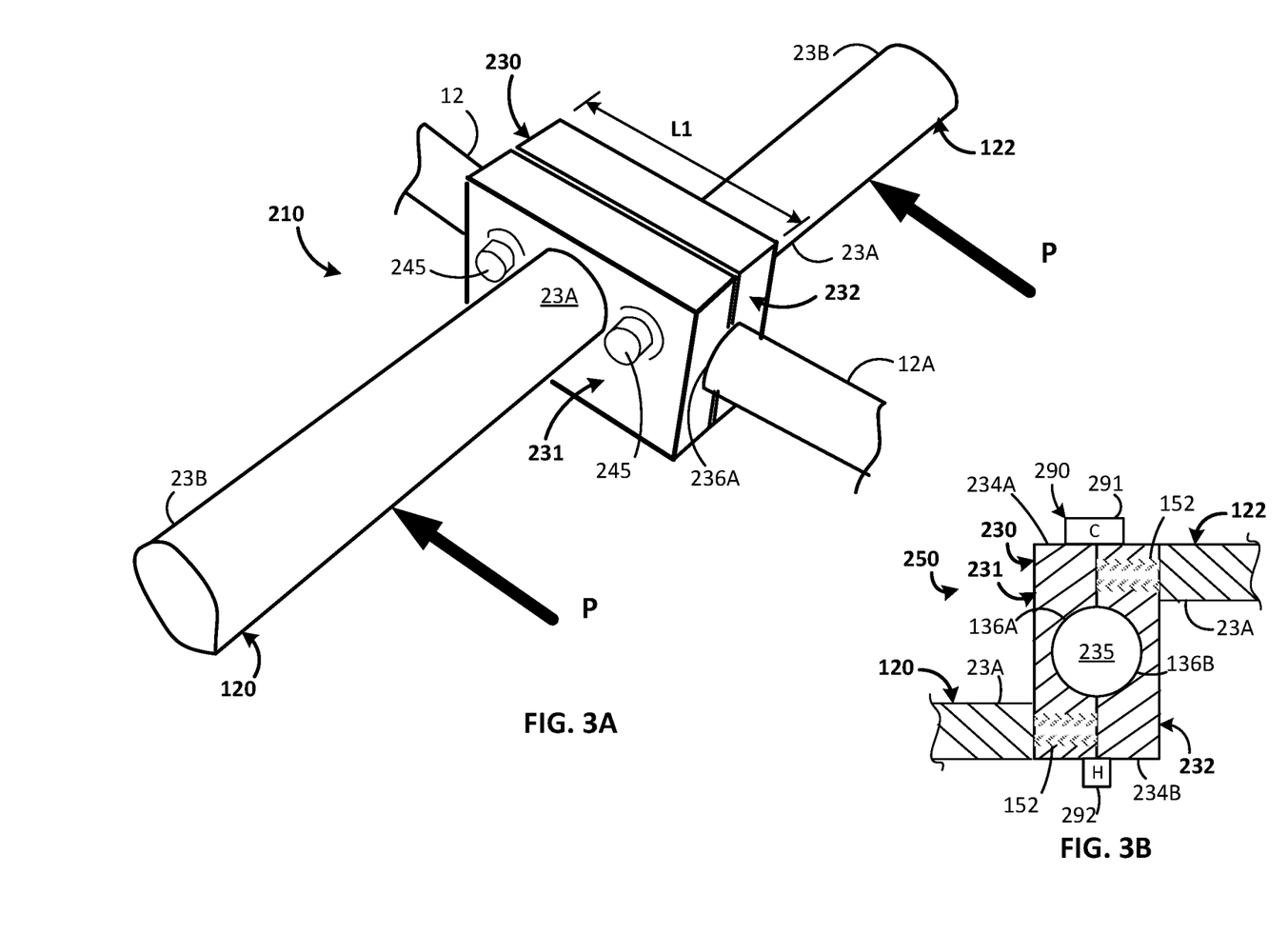
FIGS. 3A-3B are diagrams including an isometric view and side sectional view, respectively, schematically representing example hose handling devices with various example mounting portions.

FIG. 3A schematically represents an example device 210, which comprises at least some of substantially the same features and attributes as example device 10 (FIG. 1), 110 (FIGS. 2A-2D), except with (at least) the mounting portion 230 including additional and/or other means to secure a respective first and second frame portions 231, 232 relative to each other.

As shown in FIG. 3A, in some examples device 210 comprises handle portions 120, 122 (as in device 110 of FIGS. 2A-2D), which may be secured relative to mounting portion 230 via a threaded rod (e.g. rod 141 in FIGS. 2A-2D) to enable securing the handle portions 120, 122 to the respective first and second frame portions 231, 232. However, in some examples of device 210 of FIG. 3A, the rods 141 of handle portion 120, 122 are used solely to secure the handle portions 120, 122 relative to mounting portion 230 while other fasteners 245 are used to removably secure the first and second frame portions 231, 232 (of mounting portion 230) relative to each other, and relative to hose 12A. Stated differently, in such examples the handle portions 120, 122 are removably connectable relative to the mounting portion 230 independent of separate mechanisms (e.g. fasteners 245, bores, etc.) used to removable secure the mounting portion 230 relative to hose 12A. Among other aspects, this arrangement may enable, after use of device 210, removing the handle portions 120, 122 from the mounting portion 230 while leaving the mounting portion 230 secured relative to the hose 12A. Via this arrangement, once mounting portion 230 has been removably secured relative to hose 12, one can quickly and conveniently install and/or remove the handle portions 120, 122 as desired so as to increase ease in handling the hose when not using the device 210 to cause connection of the hose 12A to a receiving connector, as in FIG. 1. The removed handle portions 120, 122 may be stored or used with a different hose on which a second (e.g. different) mounting portion is already mounted or will be mounted.

In some examples, the fasteners 245 may comprise threaded rods, bolts, pins, and the like which enable removably securing the first and second frame portions 231, 232 relative to each other in a manner which exerts gripping pressure relative to outer surface 13 of hose 12A to maintain the mounting portion 230 firmly in a desired position along a length of the hose 12A and/or rotational orientation about a circumference of the outer surface 13 of hose 12A.

In some examples, the mounting portion 230 generally (or first and second frame portions 231, 232 individually) may comprise a length (L1) which is substantially greater than an analogous dimension of the mounting portion 130 in FIGS. 2A-2D to provide enough space on the respective frame portions 231, 232 to accommodate the presence of the other fasteners 245 used to secure the first and second frame portions 231, 232 relative to each other independently of the manner in which handle portions 120, 122 are removably secured relative to the mounting portion 230. Among other aspects, the increased length of the mounting portion 230 also may substantially increase the surface area of a lumen (e.g. 135 in FIGS. 2A-2D) which engages the outer surface 13 of hose 12A, which in turn may increase the gripping forces by which the position (e.g. longitudinal) and/or orientation (e.g. rotational) of the mounting portion 230 is maintained relative to hose 12.

FIG. 3B is a diagram including a sectional side view schematically representing an example device 250. In some examples, device 250 may comprise at least some of substantially the same features and attributes as the example device of FIG. 3A, except (at least) with a fastener 290 to removably secure the respective first and second frame portions 231, 232 relative to each other instead of fasteners 245 (FIG. 3A). Accordingly, fastener 290 still enables the handle portions 120, 122 to be removably secured relative the mounting portion 230 without also using the handle portions 120, 122 to secure the first and second frame portions 231, 232 relative to each other.

With this in mind, FIG. 3B illustrates that in some examples, the rod 141 of each handle portion 120, 122 may extend solely into/through, and be removably secured relative to, just one of the respective first and second frame portions 120, 122. It will be understood that this arrangement also may be applied to the mounting portion 230 of FIG. 3A, in some examples.

As further shown in FIG. 3B, in some examples the fastener 290 may comprise a hinge (H) 292 and a clasp (C) 291. The hinge 292 may hingedly connect a second end portion 234B of the respective first and second frame portions 231, 232 relative to each other, which permits selective pivotal opening and closing of the respective first and second frame portions 231, 232 about the hose (12A in FIGS. 1-3A). Meanwhile, clasp 291 is located at the first end portion 234A (opposite to end portion 234B) of first and second frame portions 231, 232 and arranged to permit selective locking of the first end portions 234A (of first, second frame portions 231, 232) relative to each other to maintain the mounting portion 230 in a pivotally closed position as shown in FIG. 3B. However, manipulation of the clasp 291 may permit pivotal opening of the mounting portion 230 to at least partially separate the first end portions 234A (of first and second frame portions 231, 232) to enable removing (or re-positioning) of the mounting portion 230 relative to hose 12A.

In some examples, the clasp 291 may comprise a buckle, ring and fastener, strap, and the like. In some such examples, the clasp 291 may comprise a tensioner to increase and/or otherwise adjust a magnitude of gripping pressure of the mounting portion 230 (e.g. lumen 35, 135) against outer surface 13 of hose 12A. In some examples, the clasp 291 may be permanently connected to one or both of the first end portions 234A (of the first, second frame portions 231, 232) while in some examples, the clasp 291 may be removably connectable to one or both of the first end portions 234A (of the first, second frame portions 231, 232).

Figure 4A:
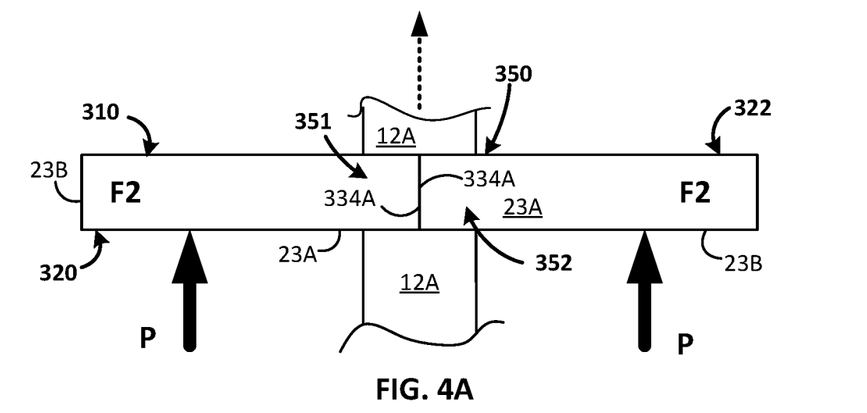
FIG. 4A is a diagram including an top view of an example hose handling device in an assembled state and removably secured relative to a hose.
Figure 4B:
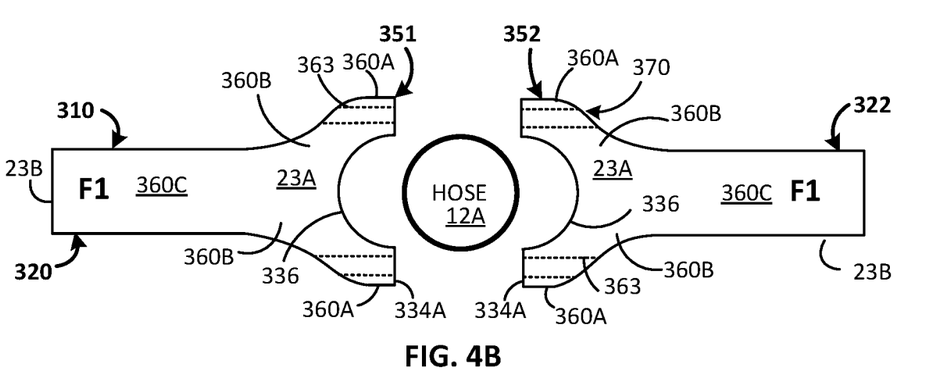
FIGS. 4B-4C are diagrams including a side view of an example hose handling device in an unassembled state and an assembled state, respectively, for removably securing relative to a hose.
Figure 4C:
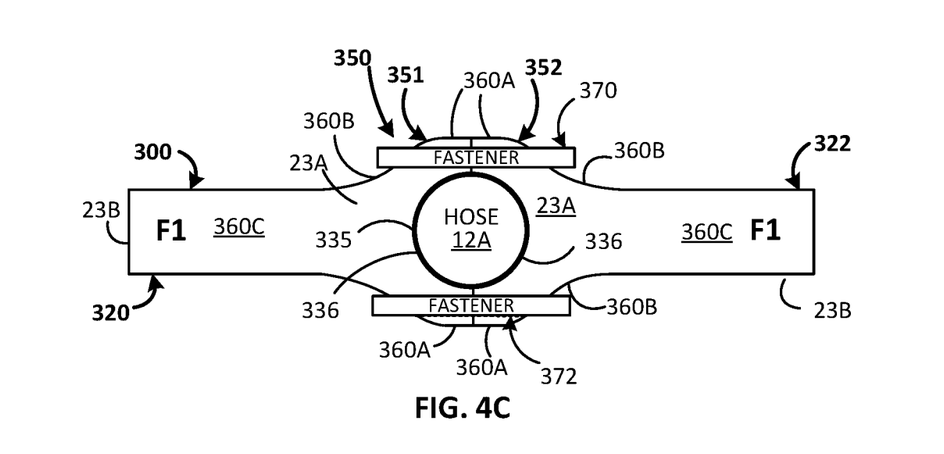

FIGS. 4A-4C are diagrams schematically representing an example device 310. In some examples, the device 310 of FIGS. 4A-4C may comprise at least some of substantially the same features and/or attributes as the examples of the present disclosure as previously described in association with at least FIGS. 1-3B.

As shown in FIGS. 4A-4C, in some examples device 310 comprises two handle portions 320, 322 (akin to 120, 122) and a mounting portion 350 including first and second frame portions 351, 352. Unlike the mounting portion 130, 230 of FIGS. 2A-3B, the first frame portion 351 of mounting portion 350 and the handle portion 320 form a single unitary piece (e.g. a monolithic element), which may be formed of a moldable material (e.g. polymer) and/or metal material. Similarly, the second frame portion 352 of mounting portion 350 and handle portion 322 form a single unitary piece, as described above. Accordingly, the first frame portion 352 and handle portion 321 may comprise (or sometimes be referred to as) being integrally formed together, and the second frame portion 352 and handle portion 322 may comprise (or sometimes be referred to as) being integrally formed together.

As further shown in at least FIGS. 4A-4B, once the mounting portion 350 of device 310 is removably secured relative to hose 12A, the handle portions 320, 322 may be grasped and pushing force (P) may be applied, as in FIG. 1. For reference and illustrative purposes, the mounted position shown in FIG. 4A, a top face F2 of the handle portions (320, 322) (and mounting portion 350) will be visible from above the hose 12A, meanwhile when viewed from the side as in FIG. 4B, a side face F1 of the handle portions 320, 322 (and mounting portion 350) will be visible.

In general terms, the handle portions 320, 322 include outer end portion 23B and inner end portion 23A, with first portion 360C of each handle portion 320, 322 being integrally joined with (formed together with) frame portions 351, 352 via transition portion 360B. Meanwhile, each frame portion 351, 352 comprises a pair of spaced apart prongs, such as prongs 360A of first frame portion 351 and prongs 360A of second frame portion 352 with the prongs 360A, 360A providing a function/structure akin to wings 137, 138 (FIGS. 2A-2D). Like the earlier examples, each frame portion 351, 352 comprises a first side portion 334A, which defines a recessed portion 336 (like recess 136) between a pair of prongs (e.g. 360A) and with the remaining first side portion 334A acting as a contact portion by which the respective frame portions 351, 352 may releasably contact each other as the recessed portion 336 of the respective first and second frame portions 351, 352 will become releasably engaged against an outer surface 13 of hose 12A.

As further shown in at least FIG. 4B, each prong 360A, 360A comprises a bore 363 via which a fastener 370, 372 (FIG. 4C) may be used to removably secure the respective first and second frame portions 351, 352 relative to each other, and relative to hose 12A in a mounted position (FIG. 4A, 4C). It will be understood that, in some examples, the bores 363 and fasteners 370, 372 may comprise any of, or a combination of, the features (e.g. threaded portions, smooth portions, tensioning, etc.) of the previously described examples in order to removable secure (e.g. forcibly secure) the mounting portion 350 onto the hose 12A.

Among other aspects, the integration of the mounting portion 350 with the handle portions 320, 322 may simplify initial mounting and handling, in at least some applications. Moreover, the integrated arrangement may simplify manufacture, ease employment of diverse materials, etc.

Figure 4D:
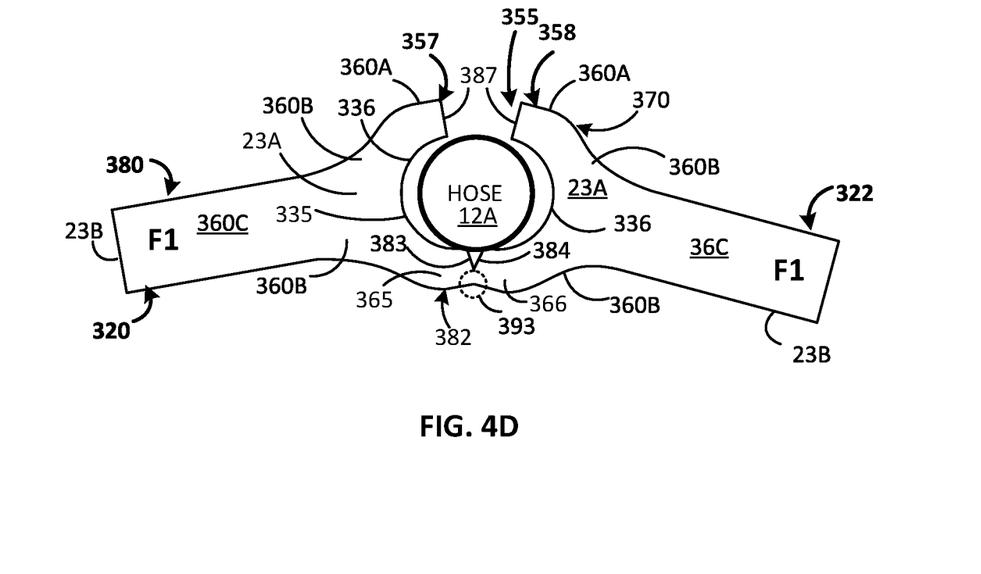
FIGS. 4D-4E are diagrams including a side view of an example hose handling device in an open pivotable state and a closed pivotable state, respectively, for removably securing relative to a hose.
Figure 4E:
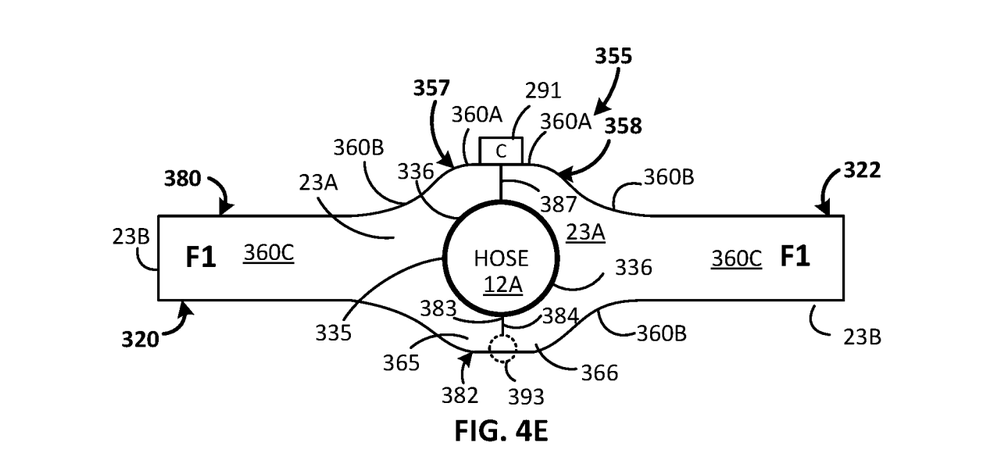

FIGS. 4D-4E are diagrams schematically representing an example device 380. In some examples, the device 380 of FIGS. 4D-4E may comprise at least some of substantially the same features and/or attributes as the examples as previously described in association with at least FIGS. 1-3B, and particularly FIGS. 4A-4C, except (at least) with separate first and second frame portions 357, 358 (akin to 351, 352 in FIGS. 4A-4C) of the device 380 of FIGS. 4D-4E forming a single unitary element in which the first and second frame portions 357, 358 are hingedly connected via a living hinge 393.

In particular, as shown in FIGS. 4D-4E, the prongs 360A, 360A on one side of the first/second frame portions 357, 358 are freestanding as in FIGS. 4A-4C. However, on an opposite side of the first/second frame portions 357, 358, freestanding, separate prongs 360A, 360A are no longer present and instead the first and second frame portions 357, 358 form a single unitary structure 382 comprising living hinge 393 (and separable end portions 383, 384 in some examples). As shown in FIG. 4D, this living hinge 393 enables pivotal movement of the prongs 360A, 360A of frame portions 357, 358 away from each other to enable positioning the mounting portion 355 onto/about the hose 12A. Once the hose 12A is positioned within the respective recessed portions 336, the freestanding prongs 360A, 360A may be pivoted (via action of living hinge 393) toward each other until end portions 387 of the respective prongs 360A, 360A (of respective frame portions 357, 358) releasably contact each other, as shown in FIG. 4E. The prongs 360A, 360A may sometimes be referred to as wings, akin to the wings described and illustrated in earlier examples of the present disclosure.

As further shown in FIG. 4E, the prongs 360A, 360A may be releasably secured relative to each other via a clasp 291, like the clasp 291 in FIG. 3B or other types of clasps, closure devices, etc. Instead of using a clasp 291, in some examples the freestanding prongs 360A, 360A may be releasably secured relative to each other in a manner consistent with the various examples of the present disclosure, such as via bores, fasteners, and/or tensioners, etc.

In some examples, the arrangement of the living hinge 393 may be implemented in other examples of the present disclosure (including but not limited to the example of FIGS. 5A-5D) to facilitate positioning and securing of a mounting portion of a hose handling device onto/relative to a hose 12A.

FIGS. 5A-5D is a diagram including an isometric view schematically representing an example hose handling device 410. In some examples, the device 410 of FIGS. 5A-5D may comprise at least some of substantially the same features and/or attributes as the examples as previously described in association with at least FIGS. 1-4E, and additional features and attributes as described below.

Figure 5A:
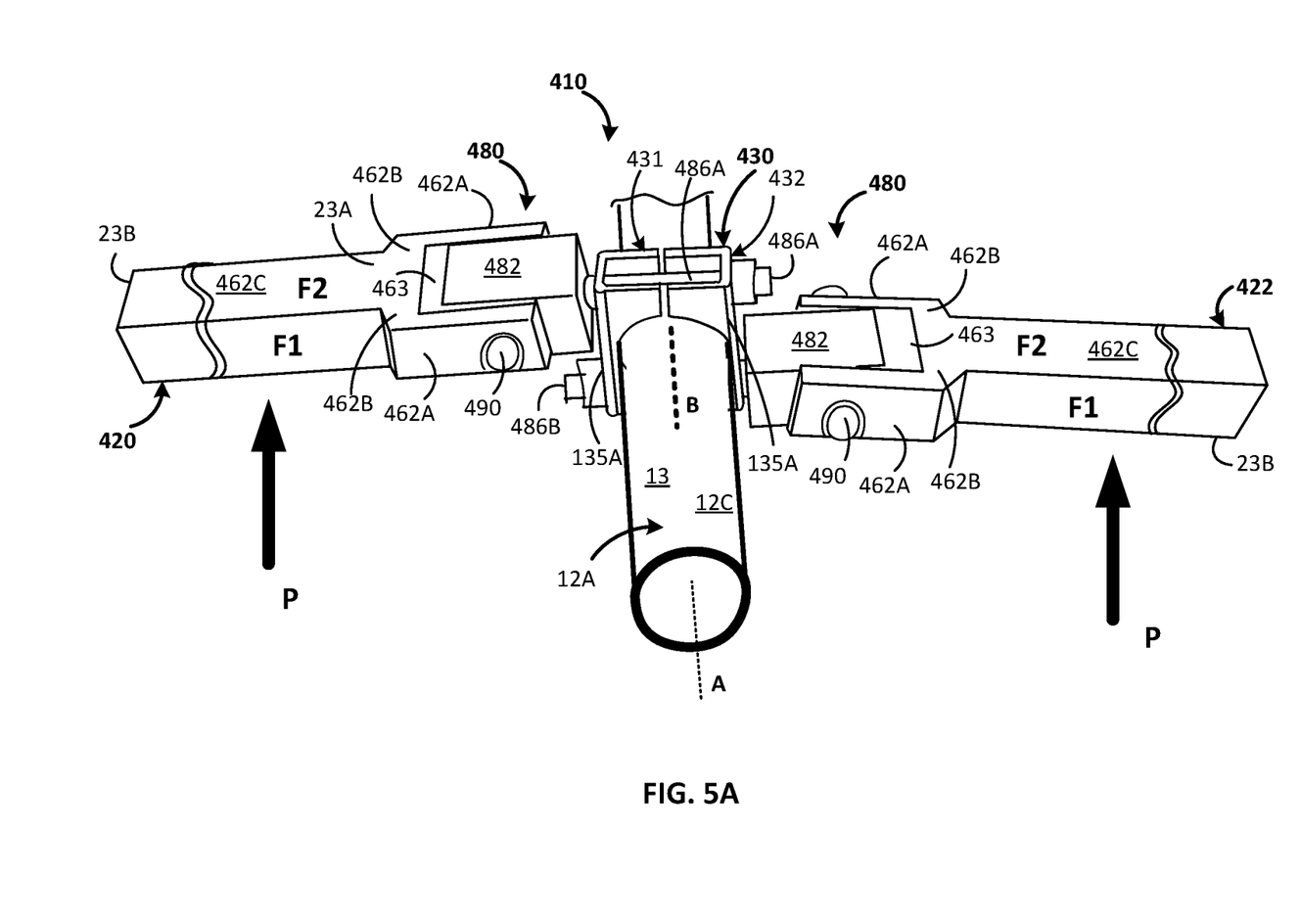
FIG. 5A is a diagram including an isometric view of an example hose handling device in an assembled state and removably secured relative to a hose.

As shown in FIG. 5A, the device 410 comprises a pair of handle portions 420, 422 and a mounting portion 430. As in the previously described examples, with the handle portions 420, 422 positioned to extend generally perpendicular to a longitudinal axis (A) of hose (conduit) 12A, a user can grasp the respective handle portions 420, 422 to apply a pushing force (arrows P) to thereby push the hose 12A forward to cause a connector end (15C of 14 in FIG. 1) to become connected to a receiving connector (17A/17B of 16 in FIG. 1). In a similar manner, the handle portions 420, 422 can be used to pull the hose 12A, if desired, to aid in disconnecting the connector end (15C of 14 in FIG. 1) from connection to the receiving connector (17A/17B of 16 in FIG. 1).

As shown in FIG. 5A, in some examples the mounting portion 430 comprises a first frame portion 431 and second frame portion 432, which comprises at least some of substantially the same (or similar) features and attributes as mounting portion 130 in FIGS. 2A-2D and/or mounting portions of FIGS. 3A-4E, with at least some differences noted below. Accordingly, the first and second frame portions 431, 432 comprise a lumen (e.g. 135 in FIGS. 2A-2D) defined by a recessed portion (e.g. 136) sized/shaped to engage an outer surface 13 of hose 12A to removably secure the mounting portion 430 relative to the hose 12A. Moreover, each frame portion 431, 432 may comprise a first side portion (e.g. 134A in FIGS. 2A-2D) in which the recessed portion (e.g. 136) is defined and from which wings (e.g. 137, 138) are formed.

Among other aspects, the mounting portion 430 comprises fasteners 486A, 486B to releasably secure the first and second frame portions 431, 432 relative to each other, and thereby removably secure the mounting portion 430 relative to the hose 12A.

However, as further described later, the fasteners 486A, 486B may additionally serve as pins, axles and/or elements providing a rotational axis about which other elements of deice 410 may rotate.

The handle portions 420, 422 may comprise outer end portions 23B and inner end portions 23A, as in other examples. The main gripping portion 462C of the handle portions 420, 422 supports a pair of spaced apart prongs 462A at inner end portion 23A, with prongs 462A, 462A extending from (and connected to) the main gripping portion 462C via a pair of transition portions 462B. Together the prongs 462A, 462A define a gap 463.

For reference and illustrative purposes, as shown in FIG. 5A, the handle portions 420, 422 comprise a second face F2 and a first face F1.

Figure 5B:
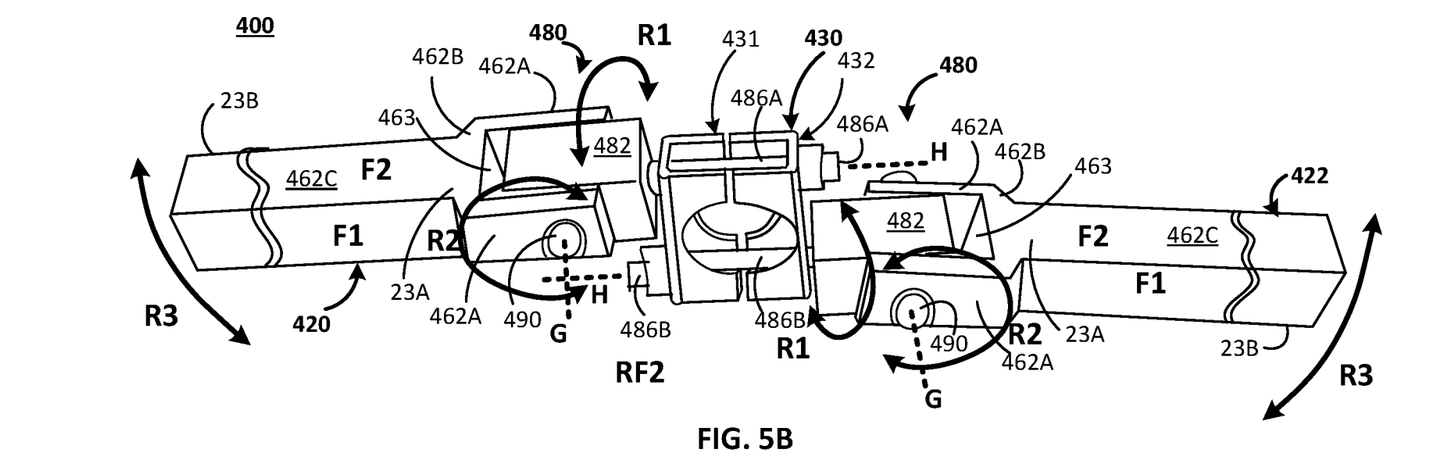
FIG. 5B is a diagram including an isometric view of the example hose handling device of FIG. 5A without illustration of the hose.

As further shown in FIGS. 5A-5B, in some examples the device 410 comprises a joint 480 at inner end portion 23A of each handle portion 420, 422, with each joint 480 connecting a respective handle portion 420, 422 to the mounting portion 430.

Among other aspects, in some examples each joint 480 comprises a rectangular cube 482 which is sized and shaped to slidably fit within a gap 483 formed between the spaced apart prongs 462A of each respective handle portion 420, 422. It will be understood that the cube 482 may take other shapes, sizes, and may comprise a hollow interior, in some examples.

In some examples, for each joint 480, the cube 482 and handle portion (420, 422) are pivotally mounted relative to each other via a pin 490 (or similar fastener), which also may act to retain these elements in their pivotal arrangement. In some examples, the pin 490 comprises a length which extends through both prongs 462A and within (and through) a bore (or other type of lumen) extending within/through cube 482, or at least extending through its side walls if cube 482 is hollow.

Together, the pin 490, cube 482, and prongs 462A, 462A enable at least one rotational degree of freedom by which handle portion 420, 422 may be rotated (arrow R2 at joint 480) about a first axis of rotation (G) via pin 490 to enable pivotal movement of handle portion 420, 422 as shown via directional arrow R3. In some examples, the arrangement of the pin 490, cube 482, and prongs 462A, 462A may comprise (and sometimes referred to as) a first joint portion.

Meanwhile, the previously described fastener 486A, 486B has a length sufficient to extend outward from outer side portions 134B of the first and second frame portions 431, 432 in order to extend within (and through) at least a portion of the cube 482, which in turn, acts to support the cube 482 and handle portion 420, 422, and their pivotal connection to cube 482 (via pin 490 and prongs 462A). Via this arrangement including fastener 486A, 486B, the cube 482 is retained in close proximity to outer side portion 134B of the first and second frame portions 431, 432 of mounting portion 430. Together, the fastener 486A, 486B (extending from first and second frame portions 431, 432) and cube 482 enable at least one rotational degree of freedom by which handle portion 420, 422 may be rotated (at joint 480) about a first axis of rotation (H) to enable pivotal movement of handle portion 420, 422 as shown via directional arrow R1. In some examples, the arrangement of (at least) the fasteners 486A, 486B and cube 482 may comprise (and may sometimes referred to as) a second joint portion.

In some examples the joint 480 may be considered to be and/or comprise at least a portion of the first frame portion 431 and the second frame portion 432. Similarly, in some examples the joint 480 may be considered to be and/or comprise at least a portion of the handle portions 420, 422.

In view of the respective rotational axes (G, H) provided at pin 490 and at fastener 486A, 486B (respectively), in some examples at least a portion of the respective mounting portion 430 and/or at least one handle portion (420, 422) may comprise (e.g. be considered to be) a biaxial joint 480 to selectively permit rotation of the handle portion (420, 422) about at least orthogonal two axes of rotation (G, H).

In some examples, the biaxial joint 480 may comprise both of the above-described first joint portion and second joint portion. In some examples, the biaxial joint 480 includes the second joint portion to permit rotation of the handle portion (420, 422) in a first orientation about/relative to a first axis of rotation (H) perpendicular to the central axis (B in FIG. 1, 5A) of the lumen (35 in FIG. 1) of the mounting portion 430 (and perpendicular to a longitudinal axis (A in FIGS. 1, 5A) of the conduit). In some examples, the biaxial joint comprises a first joint portion to permit rotation of the handle portion 420, 422 in a second orientation about/ relative to a second axis of rotation (G), which is parallel to the central axis (B in FIG. 1, 5A) of the lumen (35 in FIG. 1) of the mounting portion 430 (and parallel to a longitudinal axis (A in FIGS. 1, 5A) of the conduit).

Figure 5C:
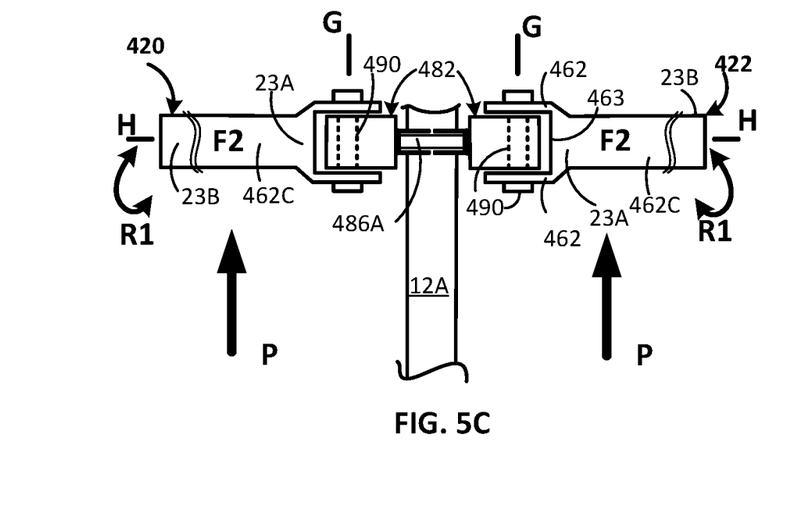
FIGS. 5C-5D are diagrams including a top view of the example hose handling device in a deployed, pushing position and a folded, storage position, respectively.

With this example arrangement per FIGS. 5A-5B in mind, reference will be made to FIGS. 5C and 5D regarding use of the device 410. First, as noted in connection with at least FIG. 5A (and as shown in FIG. 5C via arrows P), in some examples, in a first position in which the handle portions 420, 422 may extend generally perpendicular to (a central axis B of lumen 35, 135 of) mounting portion 430 (and therefore relative to hose 12A), a user may grasp and apply a pushing force (P) to the handle portions 420, 422 in order to maneuver the hose and its connector end (e.g. 15A) for faster and more secure connection to a receiving connector 16, as shown in FIG. 1. In this pushing position in an orientation parallel to a longitudinal axis A of the hose 12A, in which the pins 490 are parallel to the hose 12A (and therefore parallel to central axis B of lumen 35 (FIG. 1)), the handle portions 420, 422 remain in a generally perpendicular orientation relative to longitudinal axis A of the hose 12A (and therefore perpendicular to central axis B of lumen 35 (FIG. 1)). In other words, the handle portions 420, 422 do not pivotally collapse toward the hose while pushing in orientation P.

Figure 5D:
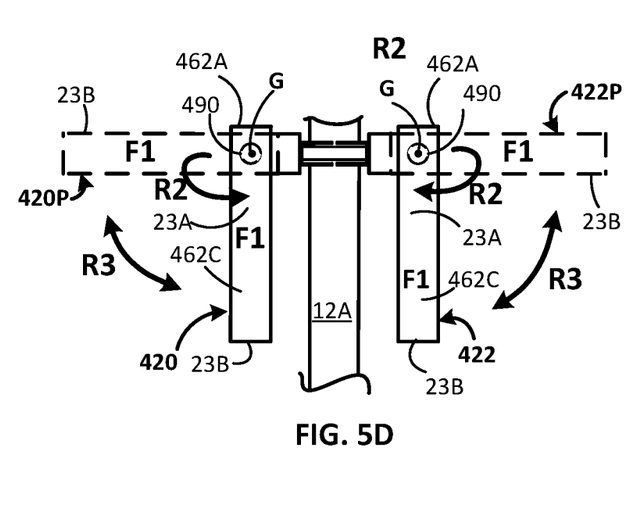

After completing use of the hose handling device 410, in some examples the user may manipulate the joint 480 in order to place the handle portions 420, 422 into a storage position (FIG. 5D).

In particular, in some examples, an initial maneuver may begin via rotating handle portions 420, 422 about axis of rotation H from the position shown in FIGS. 5A-5C (in which pin 490 is parallel to hose 12A) into the position shown in FIG. portrayed by dashed lines in which face F1 of handle portions 420, 422 can be seen in a top view (such as user standing over top of the device 410 looking down). This maneuver re-positions the pins 490 to extend general perpendicular to the hose 12A such that the user (from a top view) sees just the end of the pin 490. In this new position, a length of the handle portions 420, 422 can swing freely toward and away from the length of the hose, such as represented by directional arrow R3 in FIG. 5D.

In some examples, a further maneuver may begin by rotating handle portions 420, 422 from the position shown in dashed lines as represented by in FIG. 5D about axis of rotation G into the new position shown in solid lines in FIG. in which a length of the handle portions 420, 422 extend generally parallel to a longitudinal axis (A) of the hose 12A and generally parallel relative to a central axis (B) of the lumen (e.g. 35 in FIG. 1) of the mounting portion 430.

In some examples, a tether, rope or other fastener may be used to removably secure the handle portions 420, 422 in this storage position so the handle portions 420, 422 are retained in a low profile, less likely to interfere with any other operations of the user near the hose 12A and/or other ancillary equipment near the hose 12A.

Of course, the hose handling device 410 can be quickly converted into an in-use position by reversing the actions described in association with at least FIGS. 5C-5D and/or similar rotational maneuvering, even if performed in a different order/sequence.

It will be understood that in moving handle portions 420, 422 into a storage position (or from a storage position to a use position) a user may take advantage of the full range of movement (e.g. 360 degrees for R1, at least 180 to 300 degree for R2) along both axis of rotation (R1, R2 at pin 490, and fasteners 486A, 486B). Accordingly, a user may adopt any preferred rotational position or orientation as their preferred position for storage and/or use, depending on the particular application of the hose.

Figure 5E:
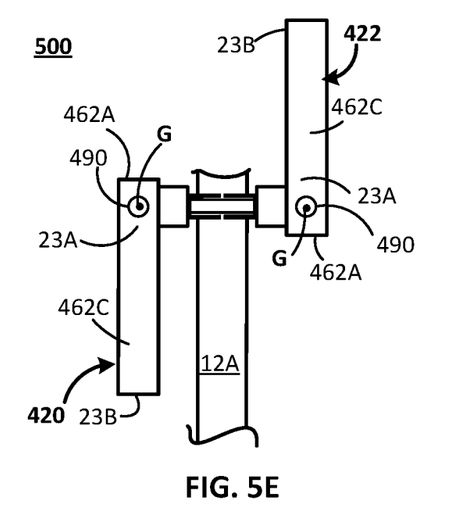
FIG. 5E is a diagram including a top view of the example hose handling device in another example folded, storage position, respectively.

Among other examples, when moved into a storage position, the handle portions 420, 422 may be rotationally manipulated so that both extend parallel to the hose 12A (and parallel to the central axis B of lumen 35, as in FIG. 1) while having a 180 degree opposite orientation, as shown in FIG. 5E.

Figure 6A:
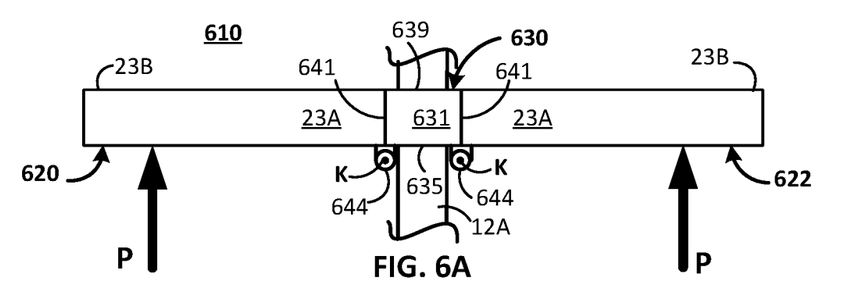
FIGS. 6A-6B are diagrams including a top view of an example hose handling device in a deployed, pushing position and a folded, storage position, respectively.
Figure 6B:
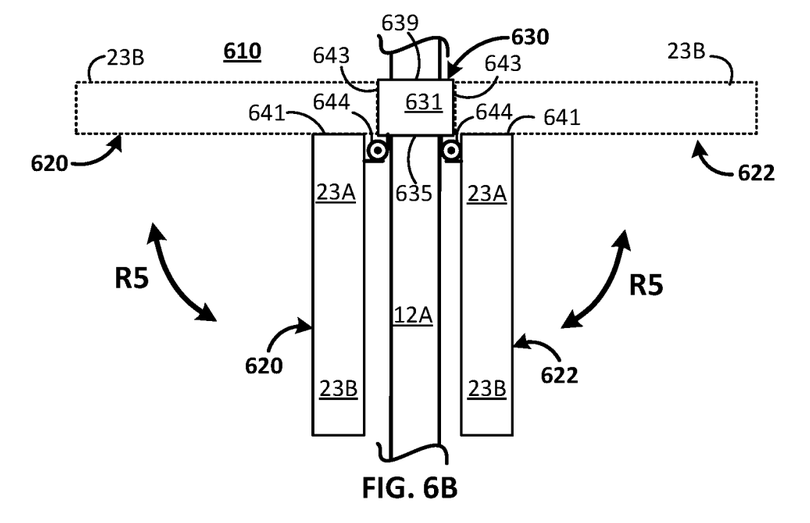

FIGS. 6A-6B are diagrams including a top view schematically representing an example hose handling device 610 and/or example method with FIG. 6A showing an in-use position, and FIG. 6B showing a storage position of, the handle portions 620, 622, respectively. In some examples, the device 610 of FIGS. 6A-6B may comprise a further example implementation of, and/or at least some of substantially the same features and/or attributes as, the examples as previously described in association with at least FIGS. 1-5E.

As shown in FIG. 6A, the device 610 may comprise a mounting portion 630 and handle portions 620, 622 which are hingedly connected to the mounting portion 630 via hinges 644. In some examples, the mounting portion 630 may comprise a frame 631, which take the form of a split clamp (in some examples) comprising at least some of substantially the same features as in at least some of the examples (FIGS. 2A-5E). In some examples, the frame 631 may comprise a pair of frame portions (e.g. in FIGS. 2A-5E) which may be joined together to secure the mounting portion 630 relative to hose 12A using any one of, or a combination of, the various bores, fasteners, tensioners, etc. of the various examples of the present disclosure and/or other securing mechanisms which also permit use and operation of hinges 644.

As further shown in FIGS. 6A-6B, the handle portions 620, 622 may comprise inner and outer end portions 23A, 23B, with inner end portion 23A comprising an end surface portion 641, while the mounting portion 630 comprises an end surface portion 643.

As can be seen in FIGS. 6A, 6B, the hinges 644 enable pivoting the handle portions 620, 622 (about an axis of rotation K) between the in-use position in FIG. 6A and the storage position in FIG. 6B, as represented by directional arrow R5. In some examples, the axis of rotation K extends generally perpendicular to a longitudinal axis B of a lumen (e.g. 35) of the mounting portion 630 (and relative to a longitudinal axis A of the hose 12A). In the in-use position, the handle portions 620, 622 extend generally perpendicular relative to a longitudinal axis B of a lumen (e.g. 35) of the mounting portion 630 (and relative to a longitudinal axis A of the hose 12A). In the storage position, the handle portions 620, 622 extend generally parallel relative to the longitudinal axis B of a lumen (e.g. 35) of the mounting portion 630 (and relative to a longitudinal axis A of the hose 12A).

In some examples, the mounting portion 630 comprises a front portion 639 and opposite back portion 635, such that upon mounting relative to hose 12A, the front portion 639 faces the first connector 15A of hose 12A in FIG. 1 (i.e. the end of hose 12A to be connected to receiving connector 16 in FIG. 1). In some examples, hinges 644 (and axis of rotation K) are positioned at the back portion 635 of mounting portion 630 opposite the front portion 639 of mounting portion 630 such that, in the in-use position and upon application of pushing forces (P), the end surface portions 641 of respective handle portions 620, 622 become pressingly engaged against end surface portions 643 of the mounting portion 630 to prevent further forward pivoting of the handle portions 620, 622 such that the applied pushing force (P) becomes translated into axial motion/force applied, via mounting portion 630, along a length of hose 12A including connector 15A (FIG. 1).

Accordingly, in this example arrangement, each hinge 644 acts as a single joint portion for each respective handle portion 620, 622, and provides a simpler foldable configuration than in the examples of FIGS. 5A-5E in which the biaxial joint of FIGS. 5A-5E offers more rotational functionality than suitable for some applications.

In some examples, the handle portions 620, 622 may be removed from their connection to mounting portion 630 by removing a pin from (and/or otherwise manipulating) hinges 644, and similarly re-installed as desired by reversing such actions. In this way, in some examples, the mounting portion 630 may remain in position on the hose 12A and handle portions 620, 622 installed and removed as desired.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein.

The invention claimed is:

1. A device comprising,
a mounting portion including a lumen sized and shaped to at least partially encompass, and to be removably secured relative to, a conduit and
at least one handle portion extending outward from the mounting portion and at a generally perpendicular first angle relative to a central axis of the lumen of the mounting portion,
wherein the mounting portion comprises a clamp defining the lumen and including:
a first frame portion; and
a second frame portion,
wherein the first frame portion and the second frame portion are removably securable relative to each other to implement the removable pouring of the mounting option relative to the conduit,
wherein each of the respective first and second frame portions form at least a portion of the lumen via a recessed portion including a size and shape corresponding to a size and shape of a cross-sectional outer surface of the conduit,
wherein each respective first and second frame portion comprise a first wing and a second wing which are located on opposite sides of the recessed portion,
wherein the first wing includes a threaded bore extending from a first side portion to a second side portion of the first wing, and the second wing includes a smooth bore extending therethrough from a first side portion to a second side portion.

2. The device of claim 1, wherein upon removably securing the mounting portion on the conduit, the first side portion of the wings of each respective first and second frame portion face each other and removably contact each other, and wherein the recessed portion of each respective first and second frame portions removably engage the outer surface of the conduit.

3. The device of claim 1, wherein the clamp comprises at least one fastener to removably secure the first frame portion relative to the second frame portion.

4. The device of claim 1, wherein the mounting portion and the at least one handle portion form a single unitary element.

5. The device of claim 1, wherein the clamp comprises:
- a first hinge located at, and connecting, a first wing of each of first and second frame portions,
- wherein the first wing of the respective first frame portion and second frame portions are hingedly connected together to permit pivoting of an opposite second wings of the respective first and second frame portion toward each other and away from each other.

6. The device of claim 5, wherein the clamp comprises a single unitary element including both of the first and second frame portions, and wherein the first hinge comprises a living hinge.

7. The device of claim 5, the mounting portion comprises a fastener or a clasp to secure opposite second wings relative to each other.

8. The device of claim 1, wherein at least a portion of the respective mounting and/or at least one handle portion comprise a biaxial joint to selectively permit rotation of the at least one handle portion about at least two axes of rotation.

9. The device of claim 8, wherein the at least one handle portion comprises a pair of handle portions with each handle portion including an inner end portion comprising at least a portion of the biaxial joint, which is removably securable relative to the mounting portion.

10. The device of claim 8, wherein the biaxial joint includes:
- a first joint portion to permit rotation of each respective handle portion in a first orientation relative to a first axis of rotation perpendicular to the central axis of the lumen of the mounting portion; and
- a second joint portion to permit rotation of each respective handle portion in a second orientation relative to a second axis of rotation parallel to the central axis of the lumen of the mounting portion.

11. A device comprising:
- a mounting portion including a lumen sized and shaped to at least partially encompass, and to be removably secured relative to, a conduit, and
- at least one handle portion extending outward from the mounting portion and at a generally perpendicular first angle relative to a central axis of the lumen of the mounting portion,
- wherein the mounting portion comprises a clamp defining the lumen and including:
  - a first frame portion; and
  - a second frame portion,
- wherein the first frame portion and the second frame portion are removably securable relative to each other to implement the removable securing of the mounting portion relative to the conduit,
- wherein each respective first and second frame portions form at least a portion of the lumen via a recessed portion including a size and shape corresponding to a size and shape of a cross-sectional outer surface of the conduit,
- wherein each respective first and second frame portion comprise a first wing and a second wing which are located on opposite sides of the recessed portion,
- wherein the clamp comprises at least one fastener to removably secure the first frame portion relative to the second frame portion,
- wherein the at least one fastener comprises a rod extending from an inner end portion of the at least one handle portion, and wherein the rod comprises a threaded portion sized and shaped to pass through a smooth bore of a second wing of a respective one of the first and second frame portions and become threadedly engaged to a threaded bore of a first wing of the other respective one of the first and second frame portions.

12. The device of claim 11, wherein each respective wing of the respective first and second frame portions comprises at least one threaded bore, which is alignable to, and sized and shaped to, receive a second fastener within and though the at least one threaded bore of each respective first and second frame portions.

* * * * *